United States Patent
Blanc et al.

(10) Patent No.: US 6,584,124 B1
(45) Date of Patent: *Jun. 24, 2003

(54) METHOD AND SYSTEM FOR ACCESSING PORTS OF A FIXED-SIZE CELL SWITCH

(75) Inventors: Alain Blanc, Vence (FR); Rene Glaise, Nice (FR)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/304,680

(22) Filed: May 4, 1999

(30) Foreign Application Priority Data

Jun. 30, 1998 (EP) .............................. 98480046

(51) Int. Cl.[7] .............. H04J 3/14; H04J 1/16
(52) U.S. Cl. ...................... 370/511; 370/513
(58) Field of Search ................ 370/351, 397, 370/471, 510, 511, 513; 359/140

(56) References Cited

U.S. PATENT DOCUMENTS

| | | | |
|---|---|---|---|
| 5,260,978 A | | 11/1993 | Fleischer et al. |
| 5,446,734 A | * | 8/1995 | Goldstein .................. 370/397 |
| 5,497,261 A | * | 3/1996 | Masetti ..................... 359/140 |
| 5,812,618 A | | 9/1998 | Muntz et al. |
| 5,822,383 A | | 10/1998 | Muntz et al. |
| 5,896,427 A | | 4/1999 | Muntz et al. |
| 5,912,881 A | | 6/1999 | Glaise et al. |
| 5,987,034 A | | 11/1999 | Simon et al. |
| 6,058,114 A | | 5/2000 | Sethuram et al. |

* cited by examiner

*Primary Examiner*—Salvatore Cangialosi
(74) *Attorney, Agent, or Firm*—Cesari and McKenna, LLP

(57) ABSTRACT

The invention provides a method and system for accessing ports of a very high-speed, fixed-size cell switch fabric. It is aimed at permitting a tradeoff between the overall number of I/Os required to access all the switch ports, that must stay within the board and modules packaging constraints and the maximum speed at which each individual wire, making up ports, may be toggled while not violating any of the speed limitation imposed by the transmission medium (board wiring) or the module interface devices; i.e., receivers and drivers. This is achieved by eliminating the need of having extra control signals, thus, greatly easing the requirement for module and board I/Os. Then, synchronization is obtained from in-band information transported by fixed-size idle logical units from a robust protocol based on two CRCs. The acquisition of synchronization does not require any particular training sequence and is conducted by the receiving device component only which retrieves computed delimiters on which it locks. The method does not assume any overhead and is obtained from the extra bandwidth available while no minimum is ever required after synchronization has been acquired.

18 Claims, 4 Drawing Sheets

EXAMPLE OF BACK TO BACK 15-BYTE IDLE LOGICAL UNITS
PART OF A BUS SPLIT IN 4 LOGICAL UNITS
FOR A SWITCH MOVING 60-BYTE CELLS

METHOD AND SYSTEM FOR ACCESSING PORTS OF A FIXED-SIZE CELL SWITCH

FIELD OF THE INVENTION

The present invention relates to communication networks and more particularly to a method and system for exchanging information, under the form of fixed-size cells, on ports and within data flow of a very high-speed switch fabric.

BACKGROUND OF THE INVENTION

The advent of very high-speed communication links (especially in the use of fiberoptical connections), along with the demand for integrating different kinds of communication traffic and services (voice, data, image, video, high quality sound, multimedia) over a single type of network, has led the telecommunications industry to develop a concept called "Broadband Integrated Services Digital Network" or B-ISDN. Recommendations to standardize this concept have been issued by the International Telecommunications Union Standardization Sector (ITU-T). The technology selected to deliver it is called Asynchronous Transfer Mode or ATM. Its chief characteristic is that information is transferred under the form of small fixed-size packets or cells as a compromise between the diverging requirements for transporting large data files or digitally coded voice. All this is described, for example, in a book by Raif O. Onvural, entitled "Asynchronous Transfer Mode Networks", Second Edition, Artech House Publishers, 1995. The key factor which makes ATM possible is the ability to build switching devices, hereafter called switch or switch fabric, which processes cells at a very high rate.

The amount of data to be moved through switches is increasing dramatically to cope with the exponential demand for bandwidth so as to exchange more and more information, in digital form, ranging from simple data files to voice, pictures and video. If, at the same time, the technology to implement the core of switches is progressing at an equivalent pace and is definitively able to easily match the bandwidth demand as far as internal processing speed is concerned, giving access to this processing capability is becoming the bottleneck. There are serious reasons which inhibit the ability to increase bandwidth on the input and output points of a switch at the same rate, namely the ports, and more generally to gain access to the components of a switch fabric:

One traditional way of boosting access throughput to a device is to increase parallelization; i.e., the number of wires and I/Os implementing the bus to access it. There is soon a limitation for a switch having many IN/OUT ports. Typically, 16×16 switches are required to cope with today's network complexity multiplying accordingly the total number of module I/Os and board wires.

The other solution is to increase the switching speed of the ports, thus allowing to transport the same quantity of data, per unit of time, on fewer wires. The limit in this case is due to the fact that the drivers located at the periphery of the modules implementing the switch fabric are made slower than imbedded logic because they have to drive higher value capacitors requiring switching more current through the parasitic inductances of the components, thus creating the well-known simultaneous switching problem which practically set the speed at which they can be toggled.

Then, implementing an access to the many ports of a switch and moving data through the switch fabric while achieving performances measured in tenths of Gigabits per second requires that both packaging and I/O performance be pushed to their limits. This makes impracticable traditional methods of exchanging data between a peripheral device and its processing unit which translates, in the field of communications more specifically considered here, into the exchange of data between an adapter, in charge of interfacing a high-speed communication line and the device that collects and dispatches the information at a network node, namely the switch. All traditional methods are making use of extra signals allowing to implement a simple protocol. A typical method, proposed by the ATM forum organization and known under the acronym of UTOPIA, described for instance in 'UTOPIA Level 2 specification, af-phy-0039.00, June 1995', uses a companion clock to sample the data on a 1- or 2-byte bus along with a delimiter indicating the start of cell (SOC). This scheme works well up to a speed where the signal skews introduced by the chips, modules and board technologies presently in use are low with respect to the data rate to achieve. Moreover, even if skews are possibly accommodated, the use of two extra signals per port, in every direction, may not be compatible with the I/O limitation here above mentioned.

A standard application of the UTOPIA bus uses a clock at 33 Mhz on a 1-byte bus allowing to have one ATM cell (53 bytes) exchanged every 1.6 $\mu$seconds which is sufficient to cope with adapters concentrating traffic on the very common third level of the Synchronous Optical Network (SONET) US hierarchy (OC-3 at 155 Mbps) or its equivalent European counterpart, the first level of the Synchronous Digital Hierarchy (SDH), called STM-1, which calls for a max processing capability of up to one cell every 2.8 $\mu$seconds. However, this becomes definitively not adequate whenever switches are able to sustain throughput measured in tenths of Gigabits per second aggregating traffic from adapter ports, each running at speed one order of magnitude higher than OC-3 and more, reaching the OC-48 or STM-16 level; i.e., 2.4 Gigabit/sec per port. At these speeds, relying on a Start of Cell signal and a companion clock to retrieve data is just not a reliable working solution.

SUMMARY OF THE INVENTION

More particularly, the invention provides, in a communication network, in which a switch is capable of switching fixed-size incoming cells, a method for giving access to ports of the switch comprising the steps of splitting incoming cells over a plurality of physical units; segmenting incoming cells into fixed-size data logical units; generating fixed-size idle logical units, of the same size as the data logical units to fill traffic for recovering, at receive side, a self-sampling clock for the physical units; inserting a delimiter within each idle logical unit, for cell delineation, said delimiter comprising two subfields, a first subfield for acquiring synchronization computed only from the delimiter itself and a second subfield computed continuously on the flow of bits for further asserting and monitoring synchronization.

The invention also provides for a system implementing the above method.

BRIEF DESCRIPTION OF THE DRAWINGS

The invention will be better understood in the hereafter description with the help of the following drawings in which.

DESCRIPTION OF THE PREFERRED EMBODIMENT

Figure 1:
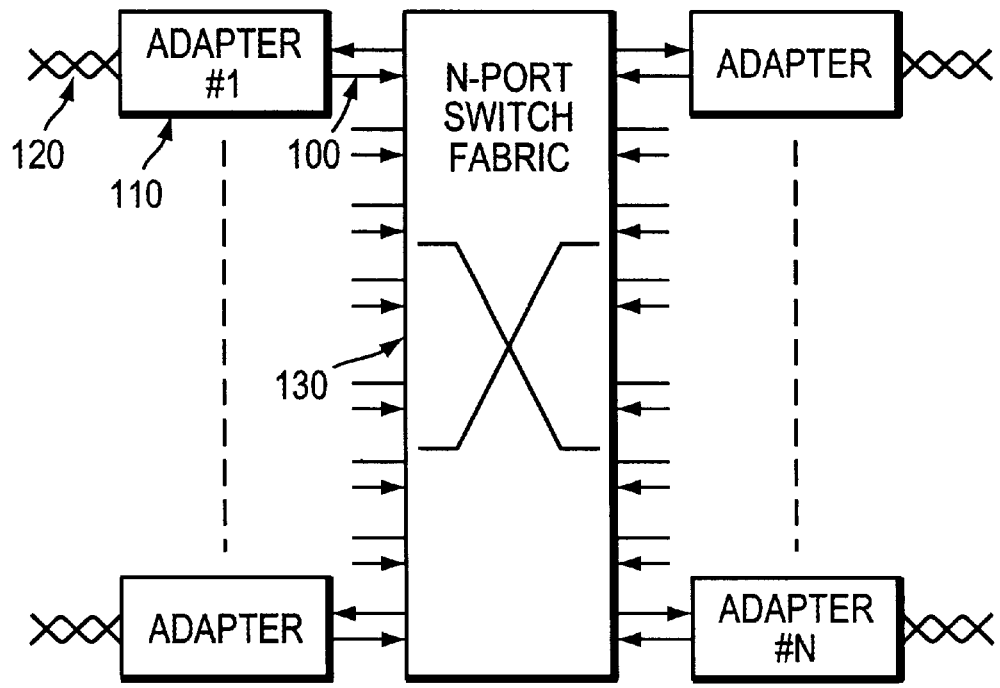
FIG. 1: shows the overall structure of a Switch with its adapters interfacing communication lines.

FIG. 1 depicts a switch [130] located at a node of communication network where information is flowing, both ways, through communication lines [120]. Switch adapters [110] accommodate the particular protocols under which information is transported over the communication lines [120] and adapt to the specific physical interface used; e.g., fiberoptic. The other role of the adapter is to format the information to/from the switch port [100] it is attached to, so as switch [130] is capable of routing it to the end user through the proper egress port. In order to prevent switch and adapters from ever getting congested which would result in traffic discarding, switch port [100] performance is always set above maximum throughput adapter [110] has to sustain through the line [120]. Because of this and due to the statistical nature of the traffic on a communication line, the user cell load does not continuously reach 100%. Then, a certain level of idle cells is always present in the continuous flow of cells circulating between the adapter [110] and the switch [130] on port [100]. Thus, the scheme of the invention relies on the idle LUs to retrieve LU delineation and to check LU's integrity. This is done with every received idle LU. It is assumed that the PU bit clock has first been recovered by an appropriate device. Only the bit clock phase has to be recovered from the incoming signal since all the ports the switch are clocked from a single source.

Figure 2:
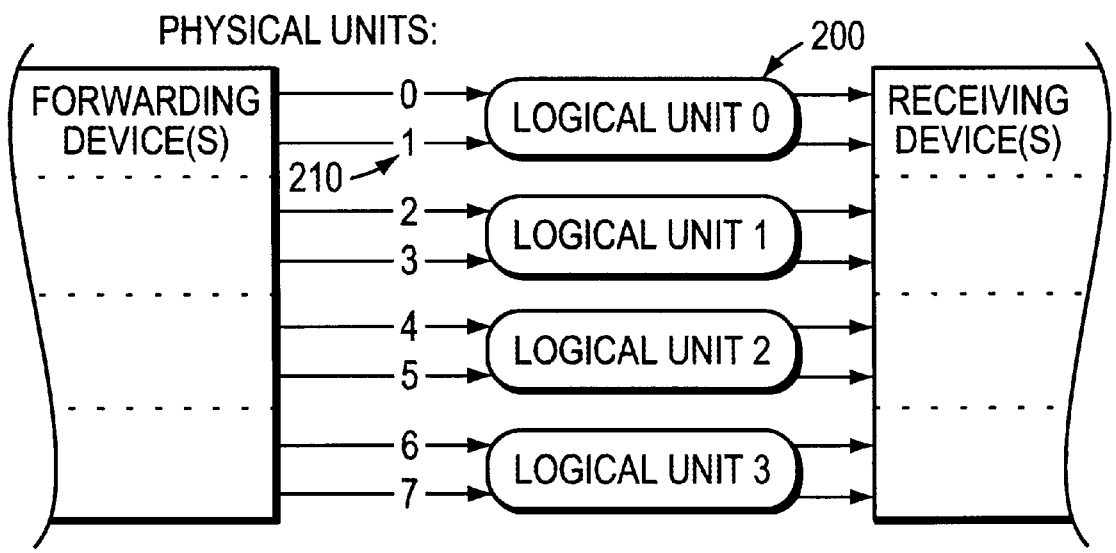
FIG. 2: depicts how the bus is split in Physical Units (PUs) carrying Logical Units (LUs) so as to cope with technology limitations.

As shown in FIG. 2, switch port access is split between X Physical Units [210] each carrying a Logical Unit [200] over Y wires so as the frequency of the PU clock is N×8÷X×Y times slower than the required port bit rate. N is the total number of bytes of the cell. After recovery of the PU clock, if necessary (Y)1; i.e., if PU comprises more than one wire), the skew of the various PUs constituting the LUs may have to be compensated.

Figure 3:
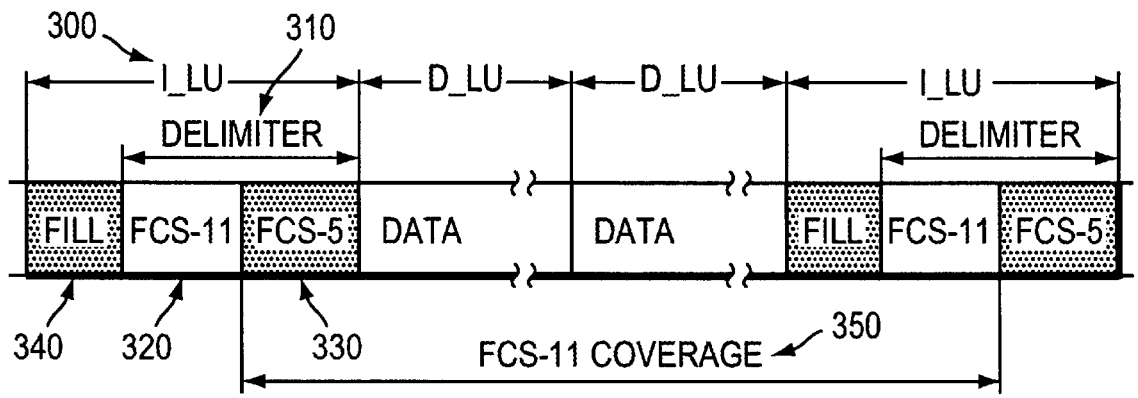
FIG. 3: shows a mix of fixed-size Idle (I_LU) and Data (D_LU) Logical Units according to the present invention.

Now referring to FIG. 3, it is shown that the mechanism hinges on the implementation of a computed delimiter pattern [310] in the idle LU (I_LU)[300]. This 16-bit wide field is split between an 11-bit sub-field [320] and a 5-bit sub-field [330]. The latter is the Field Check Sequence FCS-5 covering only the 16 bits of the delimiter itself [310]. The degree 5 polynomial used to compute the 5-bit FCS is able to protect up to $2^5-1=31$ bits so it is well sufficient for the 16-bit delimiter. The first 11-bit field [320] is the FCS-11 covering the data bits transmitted since the last I_LU was encountered. This includes the previous FCS 5-bit field and the fill pattern [340] of the current cell. The chosen polynomial for computing FCS-5, out of 6 possible for this degree, is:

$$G_5 = X^5 + X^3 + 1$$

Figure 4:
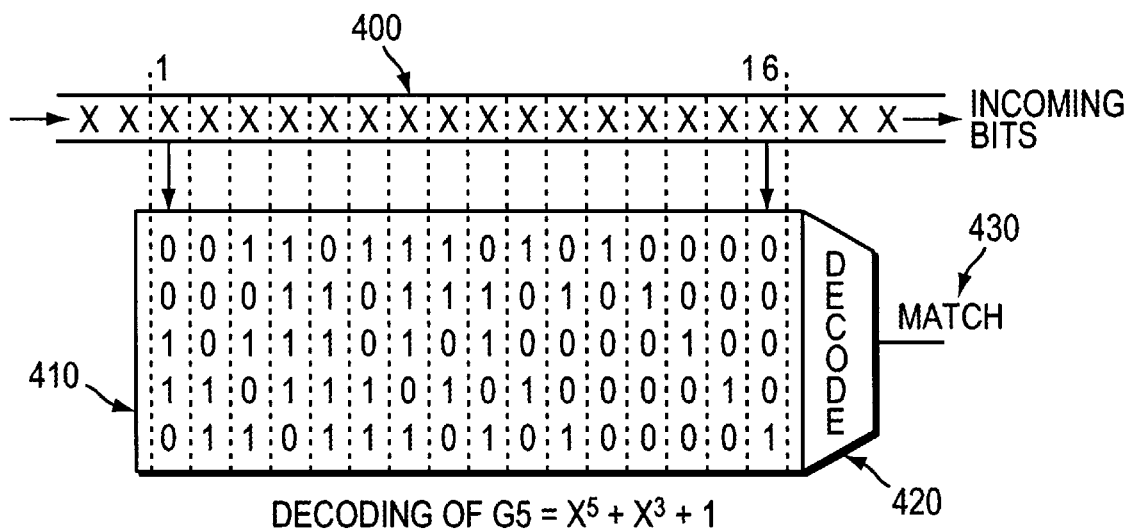
FIG. 4: is the matrix from which logic to compute 'on the fly' the CRC-5 to first locate the idle cells in an unsynchronized flow of bits should be derived.

Because delimiter [310] has a fixed length (11+5=16 bits), a checking of the FCS-5 field added by the transmitter is preferably performed on-the-fly with a combinatorial logic derived from the so-called "H" matrix shown in FIG. 4. Any 16-bit combination of the incoming bit string [400], applied to the 16 columns of the matrix [410] and decoding an all zero 5-bit syndrome or any other agreed pattern in [420] so as a MATCH is found [430], must be assumed to be the 16-bit delimiter encoded by the forwarding device or is an imitation due to the particular string of data bits observed on the bus at that time.

To further check bus synchronization and to guarantee data integrity between two idle cells an irreducible degree-11 polynomial with a minimum number of terms; i.e., 3 has been chosen to compute and check a FCS-11 field. It is:

$$G_{11} = X^{11} + X^2 + 1$$

On the contrary of what is generally done with CRC, the computation starts here with an initial value of zero. Coming back to FIG. 3, it shows that FCS-11 field [320], the remainder of the division by the above degree-11 polynomial of the data string, is added without alteration, into the 11-bit subfield, of the idle cell delimiter [310]. Hence, the receive device continuously checks the flow of incoming bits and keeps dividing by $G_{11}$ polynomial. Because the exact remainder is added by the source, the checking must divide exactly (return to zero) each time a FCS-11 subfield is encountered within an idle cell. This is the indication that the data has not been altered while the bus is still well synchronized. FCS-11 is computed starting from the first bit of the FCS-5 (primarily used to acquire synchronization) up to, but excluding, the first bit of the next FCS-5 as shown by [350].

Figure 5:
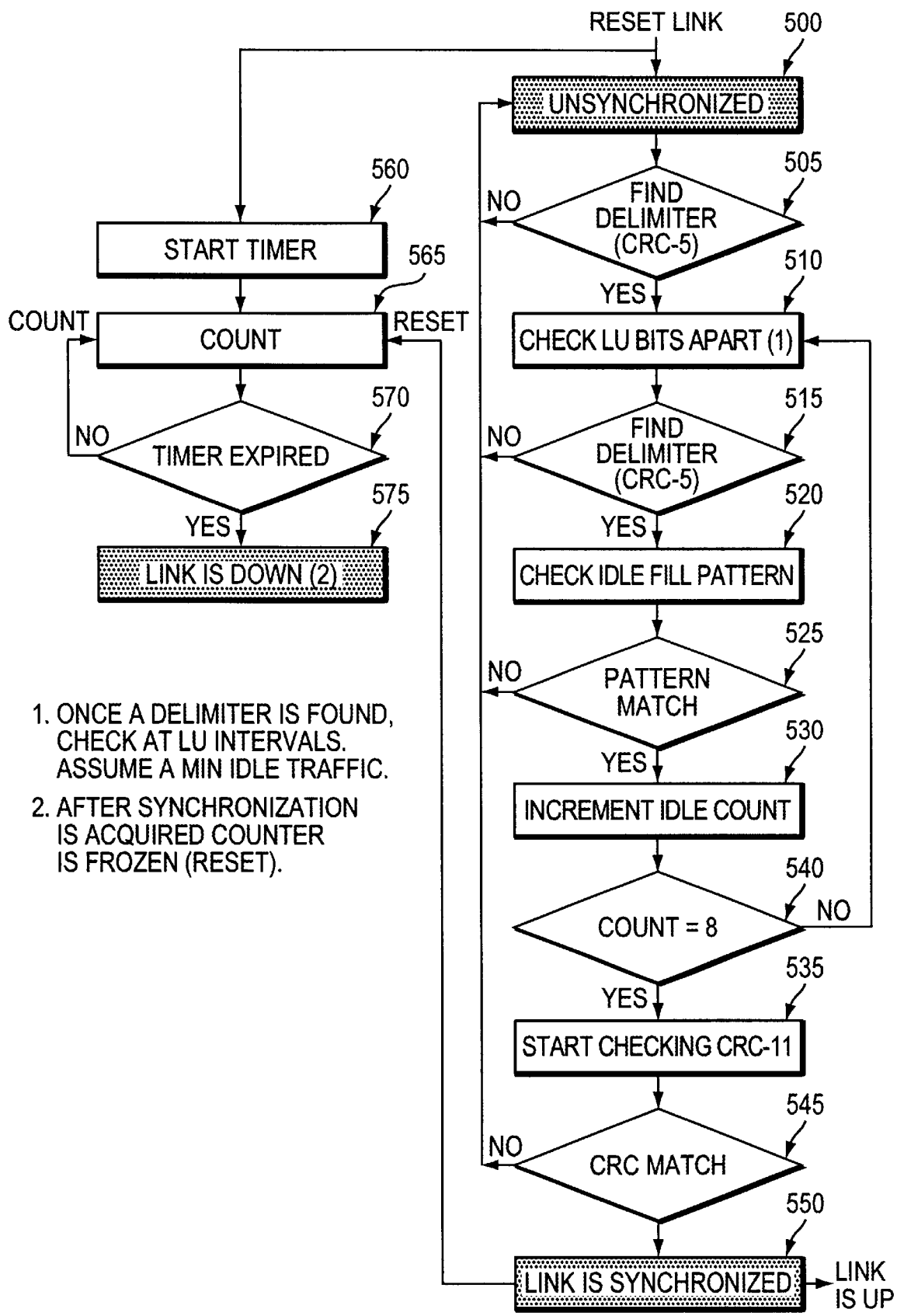
FIG. 5: is the flow chart showing how synchronization is acquired from an unsynchronized flow of bits and when link is declared down.

The first objective of the receiver is to acquire synchronization, after which it monitors it continuously. The process to gain synchronization is shown in FIG. 5. Coming from an unsynchronized state [500], the receiver first tracks the position of the I_LU delimiter using, for instance, a logic derived from the FCS-5 "H" matrix shown in FIG. 4. If no delimiter can be found, so answer is NO to step [505], receiver logic remains in the 'unsynchronized state' until timer [570] expires, in which case, the link is declared to be DOWN at step [575]. Timer was initially started [560] when step [500] was first entered, for instance after a reset, in an attempt to retrieve bus synchronization. Timer is incrementing at step [565] unless the link is synchronized, in which case, counter is frozen preventing timer to expire. If, however, the answer to step [505] is positive because a delimiter has been found (or an imitation), then receiver synchronization logic (abbreviated to RSL in the following) is performing further checking of the CRC-5 delimiter at step [515] exactly at intervals corresponding to the LU size (or multiple of; i.e., N×8÷X bits apart) as shown in step [510]. This assumes the presence of a minimum rate of idle cells in the incoming flow of bits. If, at step [505], the positive answer was the result of an imitation, then no further decoding, at LU intervals, is assumed to occur, in which case, step [505] is forced to exit, back to step [500] where the synchronization sequence resume, when the number of LU intervals without any found I_LU has exceeded the threshold corresponding to the minimum Idle cell traffic that should be observed on the bus. However, each time CRC-5 is passing, at LU intervals, the idle cell fill pattern [340] is checked at step [525] to further attest of the presence of an idle cell. Whenever answer to test [525] is negative, synchronization process aborts returning to [500]. If test [500] is positive, an Idle counter, within RSL, is incremented by 1 and loop resume at step [510], unless counter has reached the value of 8 indicative that 8 consecutive Idle cells, carrying the expected fill pattern on top of decoding a good CRC-5 and spaced exactly of an integer number of LUs have been detected, in which case, RSL logic proceeds to step [535] starting to check next CRC-11 at step [545]. If result of this test is positive, the link is declared being synchronized at step [550] and is ready for normal operation. If answer is negative, the whole synchronization process must resume at step [500]. Idle counter [530] is reset each time the 'unsynchronized state' [500], for whatever reason, is entered.

To allow the above-described process to end up successfully, it is highly desirable that not any consecutive 16-bit field of the idle fill pattern may possibly pass CRC-5 checking. This would obviously be detrimental to a good acquisition of LU synchronization because RSL could lock on a wrong, however, well-spaced, FCS-5 field. Although this is normally detected at step [525], it is possible that the synchronization process, permitted to occur while transmit side is still trying to send data, be fooled by the presence of a regular 'malicious' Data LU pattern. This situation is prevented from happening by choosing an appropriate Idle fill pattern as the one shown in FIG. 6. Pattern [600], in hexadecimal notation, does not simulate any good CRC-5 checking, but at its normal position [610], while back-to-back Idle cells are sent from the transmit side. At the same time, CRC-11 is checked good each time field [620] is encountered, thus confirming the acquisition of the synchronization. To expedite synchronization, it should preferably be conducted in presence of idle cell traffic only because, anyway, data cannot be guaranteed to be properly delivered while bus is not yet synchronized or has lost synchronization. If accomplished in presence of data, FCS-11 field [620] may then take any value and becomes the source of CRC-5 imitations that may somehow slow down the synchronization process, although the predominant factor is the proportion of idle cells in the traffic that finally sets the elapse time of the process. Indeed, out of $2^{16}$ or 65536 combinations possible for a 16-bit pattern, only $2^{11}$ or 2048 are simulating a good CRC-5. This represents only a probability of 0.031 assuming data pattern, thus FCS-11, are random.

Figure 7:
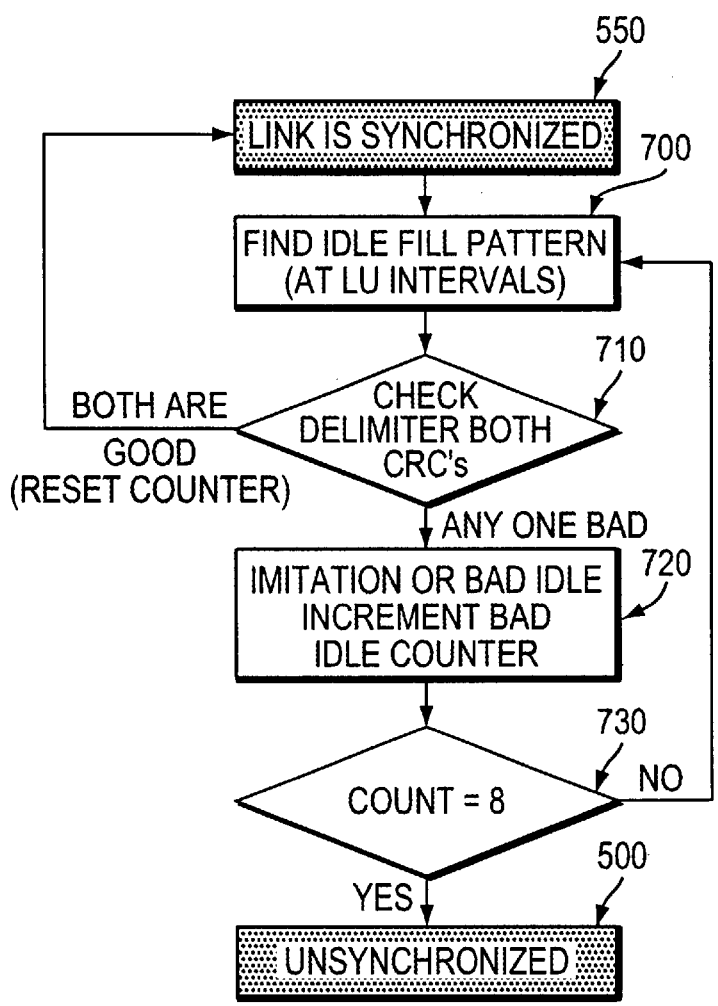
FIG. 7: is the flow chart of how synchronization is lost.

After synchronization is acquired, receiver should remain in-synch as long as link is ON. However, if bus is disturbed, synchronization is lost and RSL returns to the unsynchronized state. The conditions under which bus synchronization is lost are shown in FIG. 7. Except, if only the 5-bit field of the delimiter CRC-5 is affected, the general case is that both CRC-11 and CRC-5 of the delimiter are affected when bus is disturbed Oust because FCS-5 is computed over FCS-11). As a consequence, de-synchronization process consider the delimiter as a whole. It is said to be bad if either one (both in the general case) of the CRC checking fails. Thus, as long as bus is synchronized, RSL keeps checking Idle cells, at LU intervals, as shown at step [700]. Whenever the expected fill pattern is found, an Idle cell is assumed and both CRCs are checked at step [710]. If found to be good, process keeps going returning to the synchronized state [550]. However, if either one of the CRC checking fails, an imitation or a bad idle cell is assumed, so moving to step [720] where the 'bad idle cell counter' is incremented. If the count is less than 8, which is tested at step [730], process returns to step [700] where idle cell checking keeps going. Whenever 8 idle cells in a row fail, passing CRC checking test [730] exits to step [500] entering the 'Unsynchronized state'. However, if a good Idle cell is found again test [710] exits instead to step [550] resetting the counter of [720].

Figure 6:
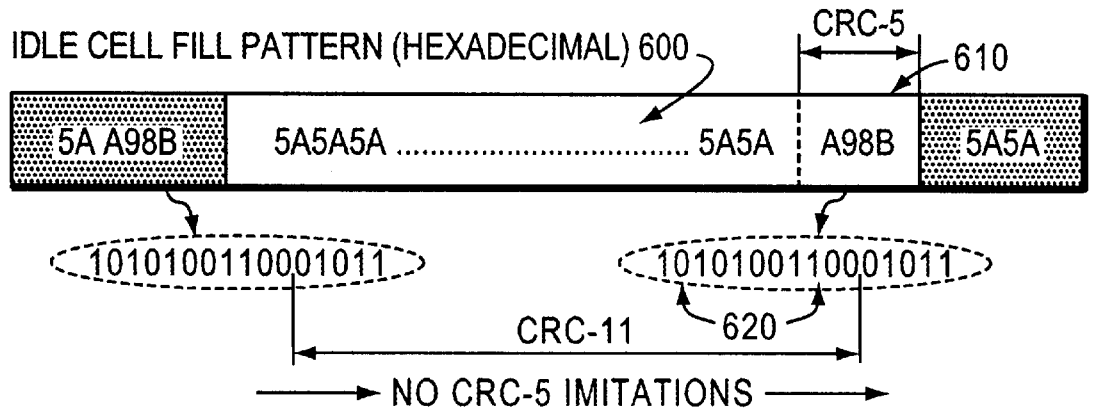
FIG. 6: is an example of back-to-back 15-byte Idle LUs to quickly retrieve synchronization.

As far as the transmitter operation is concerned, things are much simpler. Transmitter uses its own PU clock to send data LUs, to insert Idle fill pattern and compute the FCS-11 along with the corresponding FCS-5 which are inserted in the respective delimiter position of each idle cell it has to send to complete the traffic in the absence of user data and to meet the minimum Idle cell traffic that should be present on the bus, although under nominal conditions, after synchronization is acquired, no loss of synchronization can be a direct consequence of a complete absence of Idle cells for a significant period of time. The minimum idle traffic should preferably be such that CRC-11 has its full error detecting capability which is true if it spans on no more than $2^{11}-1$ or 2047 consecutive bits. In the example of FIG. 6, where LUs are 15-byte long, no more than 16 consecutive data LUs should be transferred without an Idle LU. In such a case, Idle traffic represents less than 6% of the total traffic which definitively matches the requirement of having the switch port performance set above the highest throughput supported by the adapter telecommunication line so as to avoid any congestion within adapter or switch. However, the chief purpose of CRC-11 being here to monitor bus synchronization and not data integrity, which must be guaranteed by higher level data protocols, the above minimum Idle cell traffic is, by no means, a requirement. The mechanism of the invention works with lower idle cell traffic. Only the elapsed time to acquire synchronization may be affected by the proportion of Idle cells in the incoming traffic at receive end.

The hereinabove description of the preferred embodiment of the invention has been presented for the purposes of illustration and description. It is not intended to be exhaustive or to limit the present invention to the precise form disclosed. Many variations and modifications, obvious to the man skilled in the art, are possible in light of the above teachings and are intended to be incorporated hereinafter.

What is claimed is:

1. In a communication network in which a switch is adapted to switch fixed-sized incoming cells, a method for giving access to ports of the switch comprising the steps of:
   (a) splitting incoming cells over a plurality of physical units;
   (b) segmenting incoming cells into fixed-size data logical units;
   (c) generating fixed-size idle logical units, of the same size as the data logical units to fill traffic for recovering, at a receive side, a self-sampling clock for the physical units;
   (d) inserting a delimiter within each idle logical unit, for cell delineation, said delimiter comprising two subfields:
      (1) a first subfield for acquiring synchronization computed only from the delimiter itself; and
      (2) a second subfield computed continuously on the flow of bits for further asserting and monitoring synchronization.

2. The method of claim 1 wherein said delimiter subfields are computed from two Cyclic Redundancy Checks (CRCs);
   (a) a first CRC, to compute subfield, having the appropriate properties to protect the delimiter and to limit the number of times the flow of data bits can mimic it so that the acquisition of synchronization is not impaired by numerous imitations outside of the delimiter itself,
   (b) a second CRC, to compute subfield, having the appropriate properties to cover the longest string of user cell, without idle logical unit, whose size however does not exceed the size of an idle logical unit when concatenated with above field and fill pattern.

3. The method of claim 2 where said Idle Logical Units include a unique fill pattern for identification, said pattern chosen so as, in a flow of contiguous back-to-back idle logical units, it permits to lock immediately on the delimiter.

4. The method of claim 3 further comprising the steps of acquiring synchronization wherein:
   (a) a delimiter is first retrieved, in the received flow of bits;
   (b) followed by subsequent delimiters fetched at evenly spaced intervals, representative of the logical units size and carrying the expected fill pattern, each increasing a first counting means if passing checking or resetting said first counting means if not;
   (c) then, getting confirmation of being locked on delimiters when first counting means reaches a predefined value;
   (d) finally, asserting the synchronization state by checking the second CRC on the incoming flow of bits.

5. The method of claim 4 comprising the further step of detecting a loss of synchronization wherein:
   (a) all idle logical units are continuously fetched at evenly spaced intervals representative of the logical units size and pass checking;
   (b) if not, increment a second counting means;
   (c) reset said second counting means each time an idle logical unit is passing checking again; or
   (d) assert the unsynchronized state when consecutive idle logical units fail passing checking; i.e., if second counting means reaches a predefined value.

6. A program product, said program product being configured to execute the following steps:
   (a) splitting incoming cells over a plurality of physical units;
   (b) segmenting incoming cells into fixed-size data logical units;
   (c) generating fixed-size idle logical units, of the same size as the data logical units to fill traffic for recovering, at a receive side, a self-sampling clock for the physical units
   (d) inserting a delimiter within each idle logical unit, for cell delineation, said delimiter comprising two subfields:
       (1) a first subfield for acquiring synchronization computed only from the delimiter itself; and
       (2) a second subfield computed continuously on the flow of bits for further asserting and monitoring synchronization; and
a computer readable media containing instructions for execution in a processor for the method and practice of said program product.

7. The program product of claim 6 wherein said delimiter subfields are computed from two Cyclic Redundancy Checks (CRCs);
   (a) a first CRC, to compute subfield, having the appropriate properties to protect the delimiter and to limit the number of times the flow of data bits can mimic it so that the acquisition of synchronization is not impaired by numerous imitations outside of the delimiter itself;
   (b) a second CRC, to compute subfield, having the appropriate properties to cover the longest string of user cell, without idle logical unit, whose size however does not exceed the size of an idle logical unit when concatenated with above field and fill pattern.

8. The program product of claim 7 where said Idle Logical Units include a unique fill pattern for identification, said pattern chosen so as, in a flow of contiguous back-to-back idle logical units, it permits to lock immediately on the delimiter.

9. The program product of claim 8 further comprising the steps of acquiring synchronization wherein:
   (a) a delimiter is first retrieved, in the received flow of bits;
   (b) followed by subsequent delimiters fetched at evenly spaced intervals, representative of the logical units size and carrying the expected fill pattern, each increasing a first counting means if passing checking or resetting said first counting means if not;
   (c) then, getting confirmation of being locked on delimiters when first counting means reaches a predefined value;
   (d) finally, asserting the synchronization state by checking the second CRC on the incoming flow of bits.

10. The program product of claim 9 comprising the further step of detecting a loss of synchronization wherein:
    (a) all idle logical units are continuously fetched at evenly spaced intervals representative of the logical units size and pass checking;
    (b) if not, increment a second counting means;
    (c) reset said second counting means each time an idle logical unit is passing checking again; or
    (d) assert the unsynchronized state when consecutive idle logical units fail passing checking; i.e., if second counting means reaches a predefined value.

11. A method for operating a switch, comprising:
    (a) splitting incoming cells over a plurality of physical units;
    (b) segmenting incoming cells into fixed size data logical units;
    (c) generating fixed size idle logical units of the same size as the data logical units to fill traffic for recovering, at a receive side, a self sampling clock for the physical units; and
    (d) inserting a delimiter within each idle logical unit for cell delineation, said delimiter for acquiring synchronization of said self sampling clock.

12. The method as in claim 11, further comprising:
    writing a first subfield in said delimiter for acquiring synchronization computed only from the delimiter itself; and
    writing a second subfield in said delimiter, said second subfield computed continuously on the flow of bits, for further asserting and monitoring synchronization.

13. A switch, comprising:
    an incoming adapter to receive incoming cells, to split said incoming cells over a plurality of physical units, to segment said incoming cells into fixed size data logical units, to generate fixed size idle logical units of the same size as the data logical units to fill traffic for recovering, at a receive side, a self sampling clock for the physical units, and said adapter inserting a delimiter within each idle logical unit for cell delineation, said delimiter for acquiring synchronization at said receive side;
    a switch fabric providing said plurality of physical units, and to switch said data logical units to an egress adapter; and
    said physical units synchronizing said self sampling clock to said data logical units, to said idle logical units, and to said delimiter.

14. The apparatus as in claim 13, wherein said incoming adapter further comprises:

means for writing a first subfield in said delimiter for acquiring synchronization computed only from the delimiter itself; and means for writing a second subfield in said delimiter, said second subfield computed continuously on the flow of bits, for further asserting and monitoring synchronization.

15. A switch, comprising:

means for splitting incoming cells over a plurality of physical units;

means for segmenting incoming cells into fixed size data logical units;

means for generating fixed size idle logical units of the same size as the data logical units to fill traffic for recovering, at a receive side, a self sampling clock for the physical units; and means for inserting a delimiter within each idle logical unit for cell delineation, said delimiter for acquiring synchronization of said self sampling clock.

16. The apparatus as in claim 15, wherein said incoming adapter further comprises:

means for writing a first subfield in said delimiter for acquiring synchronization computed only from the delimiter itself; and means for writing a second subfield in said delimiter, said second subfield computed continuously on the flow of bits, for further asserting and monitoring synchronization.

17. A computer readable media, comprising:

said computer readable media having instructions written thereon for execution on a processor for the practice of the method of claim 1 or claim 11.

18. Electromagnetic signals propagating on a computer network, comprising:

said electromagnetic signals carrying instructions for execution on a processor for the practice of the method of claim 1 or claim 11.

* * * * *